United States Patent
Bansal et al.

(10) Patent No.: US 7,127,093 B2
(45) Date of Patent: Oct. 24, 2006

(54) INTEGRATED IMAGE REGISTRATION FOR CARDIAC MAGNETIC RESONANCE PERFUSION DATA

(75) Inventors: Ravi Bansal, Cranbury, NJ (US); Gareth Funka-Lea, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 565 days.

(21) Appl. No.: 10/263,867

(22) Filed: Oct. 3, 2002

(65) Prior Publication Data

US 2004/0052409 A1 Mar. 18, 2004

Related U.S. Application Data

(60) Provisional application No. 60/411,244, filed on Sep. 17, 2002.

(51) Int. Cl.
*G06K 9/00* (2006.01)
(52) U.S. Cl. .................................................. 382/128
(58) Field of Classification Search ................ None
See application file for complete search history.

(56) References Cited

U.S. PATENT DOCUMENTS

| | | | | |
|---|---|---|---|---|
| 5,359,513 | A * | 10/1994 | Kano et al. ................ | 382/128 |
| 6,067,373 | A * | 5/2000 | Ishida et al. ............... | 382/130 |
| 6,363,163 | B1 * | 3/2002 | Xu et al. .................... | 382/130 |
| 6,529,770 | B1 * | 3/2003 | Grimblatov ................ | 600/479 |
| 6,594,378 | B1 * | 7/2003 | Li et al. .................... | 382/128 |
| 6,853,857 | B1 * | 2/2005 | Pfeiffer et al. ............. | 600/436 |
| 6,901,277 | B1 * | 5/2005 | Kaufman et al. .......... | 600/407 |
| 2001/0048757 | A1 * | 12/2001 | Oosawa ..................... | 382/130 |
| 2002/0097901 | A1 * | 7/2002 | Xu et al. .................... | 382/131 |
| 2002/0168095 | A1 * | 11/2002 | Spreeuwers et al. ....... | 382/131 |
| 2003/0174872 | A1 * | 9/2003 | Chalana et al. ............ | 382/128 |
| 2004/0059213 | A1 * | 3/2004 | Kassai et al. .............. | 600/410 |

* cited by examiner

Primary Examiner—Samir Ahmed
Assistant Examiner—O'Neal R. Mistry
(74) Attorney, Agent, or Firm—Donald B. Paschburg; F. Chau & Associates, LLP

(57) ABSTRACT

A system and method for integrated image registration of cardiac magnetic resonance perfusion data are provided, where the system includes an estimation unit for estimating an edge parameter, a registration unit in signal communication with the estimation unit for registering the edge parameter in correspondence with a template-match between pixels in a first input image and pixels in a second input image, and a CPU in signal communication with said estimation unit and said registration unit for detecting a changed pixel location in accordance with said registration when the entropy of said second image is increased; and where the corresponding method for integrated image registration is of cardiac magnetic resonance perfusion data includes providing a contoured region of interest on a first image having a plurality of pixels, receiving a second image corresponding to a time other than that of said first image, calculating pixel intensities for the second image, estimating edge parameters for at least one of said first and second images, calculating a template-match between said first and second images, selecting a pair of pixel locations from at least one of said first and second images in accordance with said template-match, registering the estimated edge parameters in correspondence with said calculated template-match for a pair of pixel values at said selected locations in said first image and a pair of pixel values at said selected locations in said second image, and detecting a changed pixel location in accordance with said registration.

21 Claims, 5 Drawing Sheets

INTEGRATED IMAGE REGISTRATION FOR CARDIAC MAGNETIC RESONANCE PERFUSION DATA

CROSS REFERENCE TO RELATED APPLICATION

The present application claims priority to U.S. Provisional Patent Application Ser. No. 60/411,244, filed Sep. 17, 2002, which is hereby incorporated by reference.

BACKGROUND

In appearance-based methods for object detection and/or recognition, segmentation of images indicative of the objects of interest may be complicated by dynamic motion during the acquisition of a time-wise sequence of images. An exemplary application is segmentation of cardiac perfusion image data. Ischemic heart disease, the obstruction of blood flow to the heart, typically results from excess fat or plaque deposits, which may narrow the veins that supply oxygenated blood to the heart. The reduced blood supply to the heart is typically manifested as reduced blood perfusion to the myocardium ("MC") heart muscle. Clinically, the myocardial perfusion measurements are routinely performed with single-photon emission computed tomography ("SPECT") images, and/or with positron emission tomography ("PET") images. Drawbacks and limitations of these existing techniques include the low spatial resolution, attenuation artifacts of SPECT and limited availability of PET.

Myocardial perfusion analysis using magnetic resonance ("MR") images holds great promise, and also permits quantitative analysis of blood flow. In MR perfusion analysis, typically about 60 to 100 short axis 2-dimensional ("2D") MR images of the heart are acquired after injecting contrast agent into the blood. Unfortunately, as the heart is beating, the contrast in the acquired MR images is typically rapidly changing. The contrast agent passes through the right ventricle ("RV") to the left ventricle ("LV"), and then perfuses into the myocardium.

To perform the perfusion analysis, it is necessary to segment the myocardium in all of the MR images acquired in a perfusion scan. Segmenting the myocardium in all of the MR images is currently performed manually, and requires significant labor from skilled physicians. This is a tedious and labor-intensive job, given that there are typically 60 to 100 images in each scan. The problem is compounded by the fact that the contrast in the images is typically rapidly changing. When the contrast agent is in the LV, the blood pool brightens up and makes it easy to segment the inner wall of the myocardium, the endocardium. However, when there is no contrast agent in the LV, it is very difficult to segment the endocardium.

Segmentation of the outer boundary of the heart, the epicardium, remains difficult throughout all of the images acquired in the scan. In addition to the changing contrast, there may also be gross motion due to patient breathing and/or changes in the heart shape as it is beating. Accordingly, what is needed is an automated approach to segmentation of the myocardium, endocardium and/or epicardium in sequences of MR images.

SUMMARY

These and other drawbacks and disadvantages of the prior art are addressed by a system and method of Integrated Image Registration For Cardiac Magnetic Resonance Perfusion Data. The system includes an estimation unit for estimating an edge parameter, a registration unit in signal communication with the estimation unit for registering the edge parameter in correspondence with a template-match between pixels in a first input image and pixels in a second input image, and a CPU in signal communication with said estimation unit and said registration unit for detecting a changed pixel location in accordance with said registration when the entropy of said second image is increased.

The corresponding method for integrated image registration of cardiac magnetic resonance perfusion data includes steps for providing a contoured region of interest on a first image having a plurality of pixels, receiving a second image corresponding to a time other than that of said first image, calculating pixel intensities for the second image, estimating edge parameters for at least one of said first and second images, calculating a template-match between said first and second images, selecting a pair of pixel locations from at least one of said first and second images in accordance with said template-match, registering the estimated edge parameters in correspondence with said calculated template-match for a pair of pixel values at said selected locations in said first image and a pair of pixel values at said selected locations in said second image, and detecting a changed pixel location in accordance with said registration.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method of Integrated Image Registration For Cardiac Magnetic Resonance Perfusion Data for appearance-based object detection in accordance with the following exemplary figures, in which.

DETAILED DESCRIPTION OF PREFERRED EMBODIMENTS

The present disclosure provides an integrated image registration algorithm for segmenting the heart muscle or myocardium ("MC"). A sequence of magnetic resonance ("MR") images of the heart is acquired after injection of a contrast agent. An analysis of the perfusion of the contrast agent into the myocardium requires segmentation of the MC in each of the images acquired. This segmentation task is especially difficult due to the rapidly changing contrast in the images. Accordingly, the present disclosure presents an information registration framework that integrates two channels of information, the pixel intensities and the local gradient information, to reliably and accurately segment the myocardium.

Figure 1:
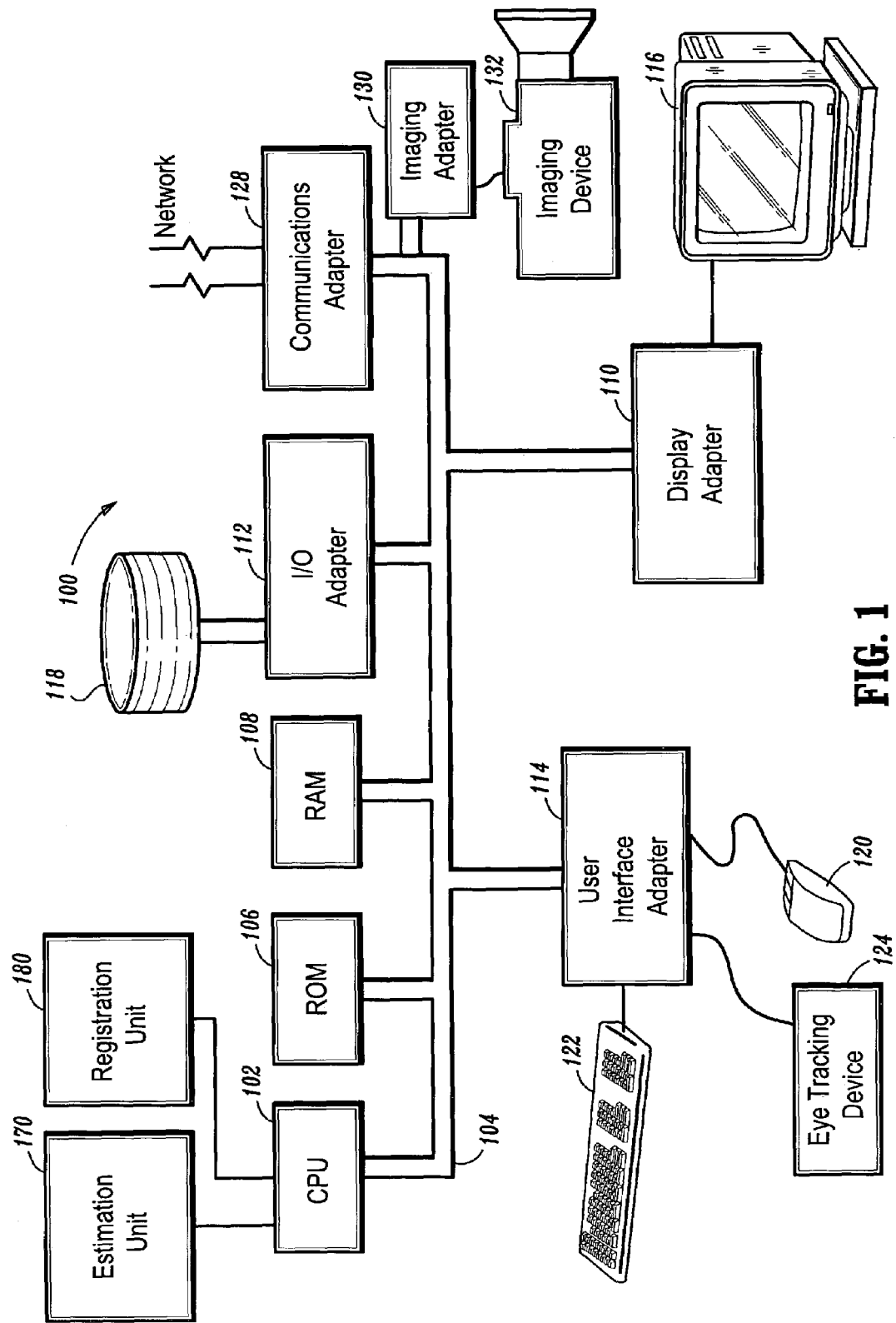
FIG. 1 shows a block diagram for an integrated image registration system according to an illustrative embodiment of the present disclosure.

FIG. 1 shows a block diagram of a system 100 for integrated image registration using cardiac magnetic resonance perfusion data according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. A magnetic resonance imaging device 132 is in signal communication with the system bus 104 via the imaging adapter 130. An edge estimation unit 170 and an image registration unit 180 are also included in the system 100 and in signal communication with the CPU 102 and the system bus 104. While the estimation unit 170 and the registration unit 180 are illustrated as coupled to the at least one processor or CPU 102, these components are preferably embodied in computer program code stored in at least one of the memories 106, 108 and 118, wherein the computer program code is executed by the CPU 102. As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the estimation unit 170 and the registration unit 180, as well as the other elements of the system 100, while practicing within the scope and spirit of the present disclosure.

Figure 2:
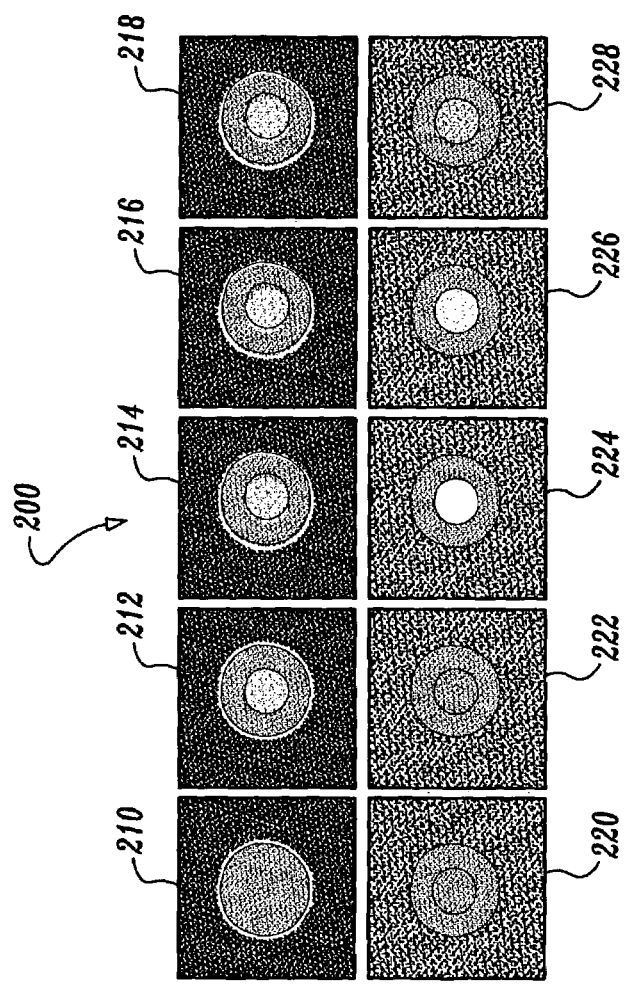
FIG. 2 shows two comparative image sequences for synthetic data, the second sequence according to an illustrative embodiment of the present disclosure.

In FIG. 2, the reference numeral 200 generally indicates two sequences of image frames of synthetic data where, in addition to rapidly changing pixel intensities, there is a sub-pixel shift to the right. Thus, the first row of images, frames 210 through 218, respectively, show the results obtained using a mutual information ("MI") based template-matching where it is assumed that there are no sub-pixel shifts. The registration is done using only pixel intensities, and the hand drawn contours are utilized to specify only the region of interest ("ROI"). Under this assumption, the sub-pixel drifts accumulate quickly, leading to noticeable shifts towards the end of the sequence, such as shown in frame 218. In the second row of images, frames 220 through 228, respectively, the results are obtained using MI based template-matching where it is again assumed that there are no sub-pixel shifts. Here, however, the registration is done using edge information, in addition to the pixel-intensities, while the hand drawn contours are again utilized to specify only the ROI. The results of frames 220 through 228, using registration with edge information, are significantly more accurate.

Figure 3:
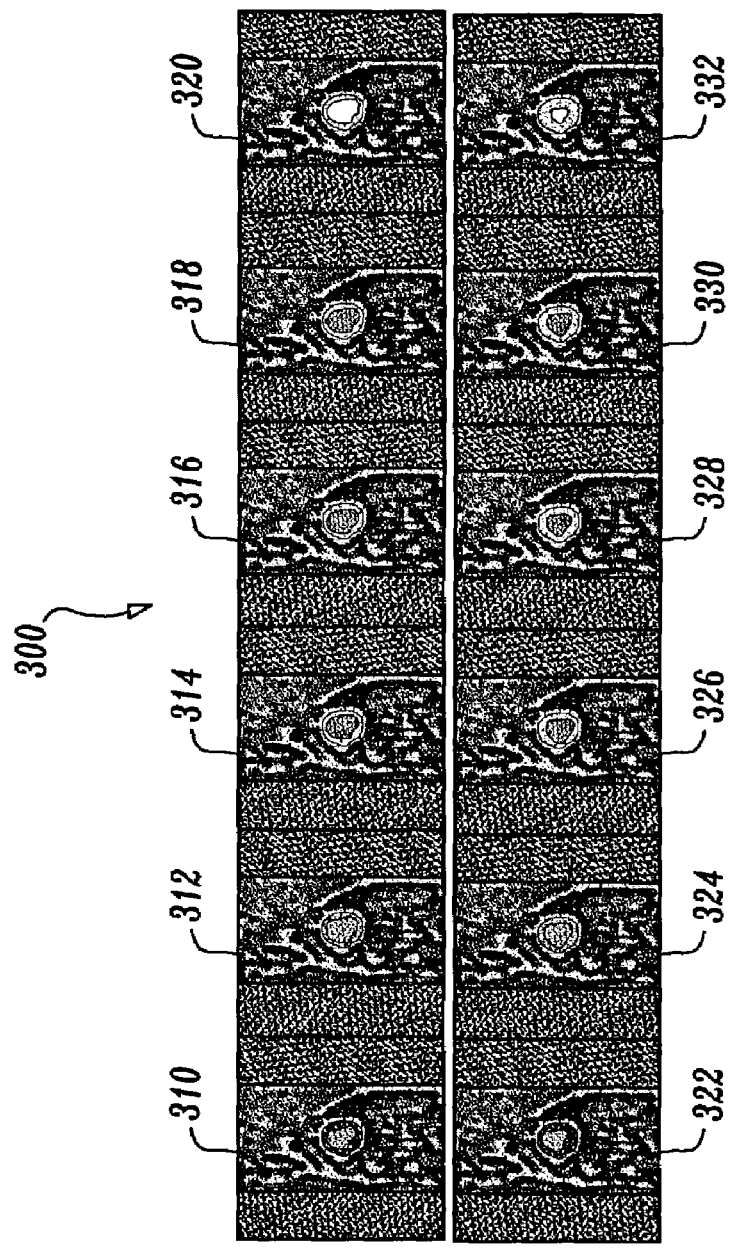
FIG. 3 shows two comparative image sequences for canine cardiac magnetic resonance perfusion data.

In FIG. 3, the reference numeral 300 generally indicates two sequences of frames of real MR perfusion data obtained for a heavily sedated dog. As the dog is heavily sedated, no gross motion is expected. The first sequence of images, frames 310 through 320, show the results obtained using pixel intensity based mutual information only, similar to that shown in frames 210 through 218 of the first sequence of FIG. 2, where the selected images were from a sequence of synthetic data having sub-pixel shifts in addition to rapidly changing pixel intensities. The first sequence of images in FIG. 3 shows results obtained using gray-scale based mutual information only, assuming no sub-pixel shifts. Even though it is estimating only whole pixel shifts, it can be seen visually that the mutual information based strategy accurately localized the myocardium in this instance. The second row of images, frames 322 through 332, show the results obtained using the mutual information based strategy while estimating sub-pixel shifts.

Thus, in FIG. 3, the time sequences 300 show MR perfusion data for a heavily sedated dog, where the first row of images 310 through 320 shows the results obtained using a pixel-intensity based MI algorithm. For the sequence of images 310 through 320 of the first row, only whole pixel shifts are estimated. The second row of images, the sequence 322 through 332, shows the results obtained using the MI based strategy with sub-pixel accuracy, where sub-pixel shifts are also estimated. Unfortunately, estimating sub-pixel shifts leads to problems as shown by drifts in the estimated myocardium of image 332, for example.

Although the whole pixel MI-only strategy of frames 310 through 320 worked well enough in the exemplary instance, the results from frames 210 through 218 of FIG. 2 showed that sub-pixel shifts will add-up for larger drifts. This suggests that a mutual information based strategy that estimates sub-pixel shifts might lead to accurate estimation of the myocardium. Therefore, to test this hypothesis, the mutual information based strategy has been implemented where it estimates sub-pixel shifts. However, the second sequence of frames, 322 through 332 of FIG. 3, shows the inaccurate results obtained where estimation of sub-pixel shifts is attempted, where estimating the sub-pixel shifts leads to drifts in the estimated myocardium. This happens due to the fact that the mutual information l(f; y) between two random variables f and y, given by l(f; y) as defined by Expression 31, while trying to minimize the joint entropy H(f; y), is also trying to maximize the marginal entropy H(y).

For estimating sub-pixel shifts, interpolation of the pixel intensities is required. Interpolation is effectively smoothing the image and hence reduces the marginal entropy H(y). To compensate for the reduction of marginal entropy due to smoothing, the algorithm shifts the optimal position where there are more variations in pixel intensities. This conclusion was supported by the fact that noticed shifts of the contours were seen only when there was no contrast in the images. When there was contrast in the images, and hence already high marginal entropy H(y), there were no spurious shifts of the contours. Since estimating sub-pixel shifts can lead to spurious drifts in the data where contrast is rapidly changing, it was decided to estimate only whole pixel shifts. However, to account for drifts due to sub-pixel shifts, the exemplary system incorporates a second channel of information in the form of edge information, to pull the contours to the myocardium.

The second row of images in FIG. 2 shows the results obtained using the combined strategy. Notice that while it estimates only the whole pixel shifts, the edge information in the registration framework pulls the contours every few frames to the right position so that the sub-pixel shifts do not accumulate.

Figure 4:
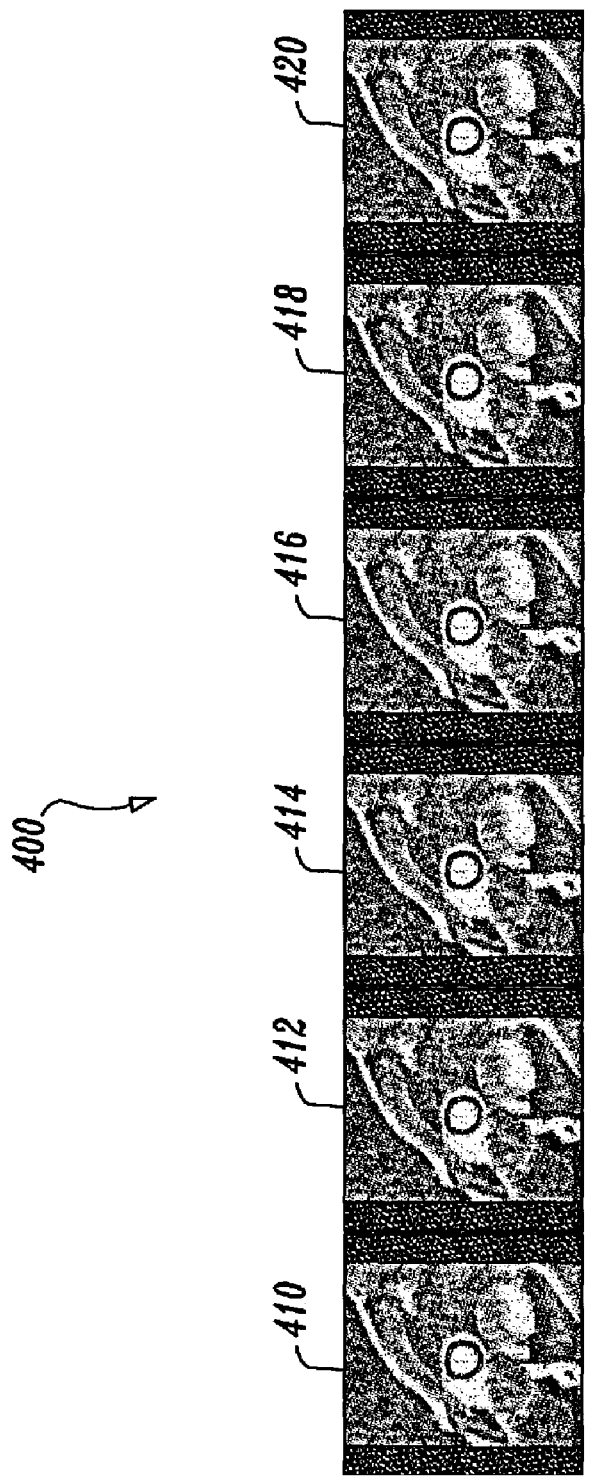
FIG. 4 shows an image sequence for human cardiac magnetic resonance perfusion data according to an illustrative embodiment of the present disclosure.

Turning now to FIG. 4, the reference numeral 400 generally indicates results obtained using the integrated registration algorithm on a real patient MR perfusion sequence, where only whole pixel shifts are estimated. The sequence results frames 410 through 420 were obtained using the integrated registration approach of the present disclosure on the MR perfusion sequence of a real patient, where, using the integrated approach, the algorithm is able to segment the myocardium reliably in the complete sequence. Note that an algorithm to segment the myocardium cannot just use the edge information in the template correlation due to rapidly changing contrast in the MR perfusion sequence.

In the sequence of images obtained, there could be images in between where the myocardial boundaries are not visible at all. If the contours are being propagated using the edge information alone then they can be completely thrown off due to these images, requiring intensive human intervention. Integration of the gray-scale pixel intensities with the registration of the edge information, as performed in our presently disclosed registration framework, overcomes this problem. Thus, the presently disclosed algorithm is able to propagate contours, and segment the myocardium, without any human intervention except for the initial hand drawn contours on one of the images in the sequence.

Results from FIG. 2 show that the registration results obtained while estimating only whole pixel shifts might not be sufficient if sub-pixel shifts are present in the image sequence. However, estimation of sub-pixel shifts can lead to spurious drifts in the sequence of images if there are images in the sequence with very low contrast, as shown in FIG. 3. These spurious drifts occur due to the fact the while estimating sub-pixel shifts, the interpolation reduces the marginal entropy. Thus it uses a devised strategy, which while estimating only whole pixel shifts can account for sub-pixel shifts. To do this the integrated registration framework integrates two channels of information, the pixel intensities and the local gradient, in one unifying registration framework. Notice that since it is estimating only whole pixel shifts, there may be sub-pixel errors in the estimated myocardial position, but the edge term will pull the contours back to the right location during the sequence such that the sub-pixel shifts do not accumulate. These results highlight that care should be taken while trying to estimate sub-pixel shifts using MI based registration strategies.

While efforts are made during acquisition of MR perfusion sequence to obtain each image during the desired phase in the heart cycle, the shape of the heart changes locally. Alternate embodiments may apply local deformations to the estimated contours to more accurately segment the changing heart shape.

Figure 5:
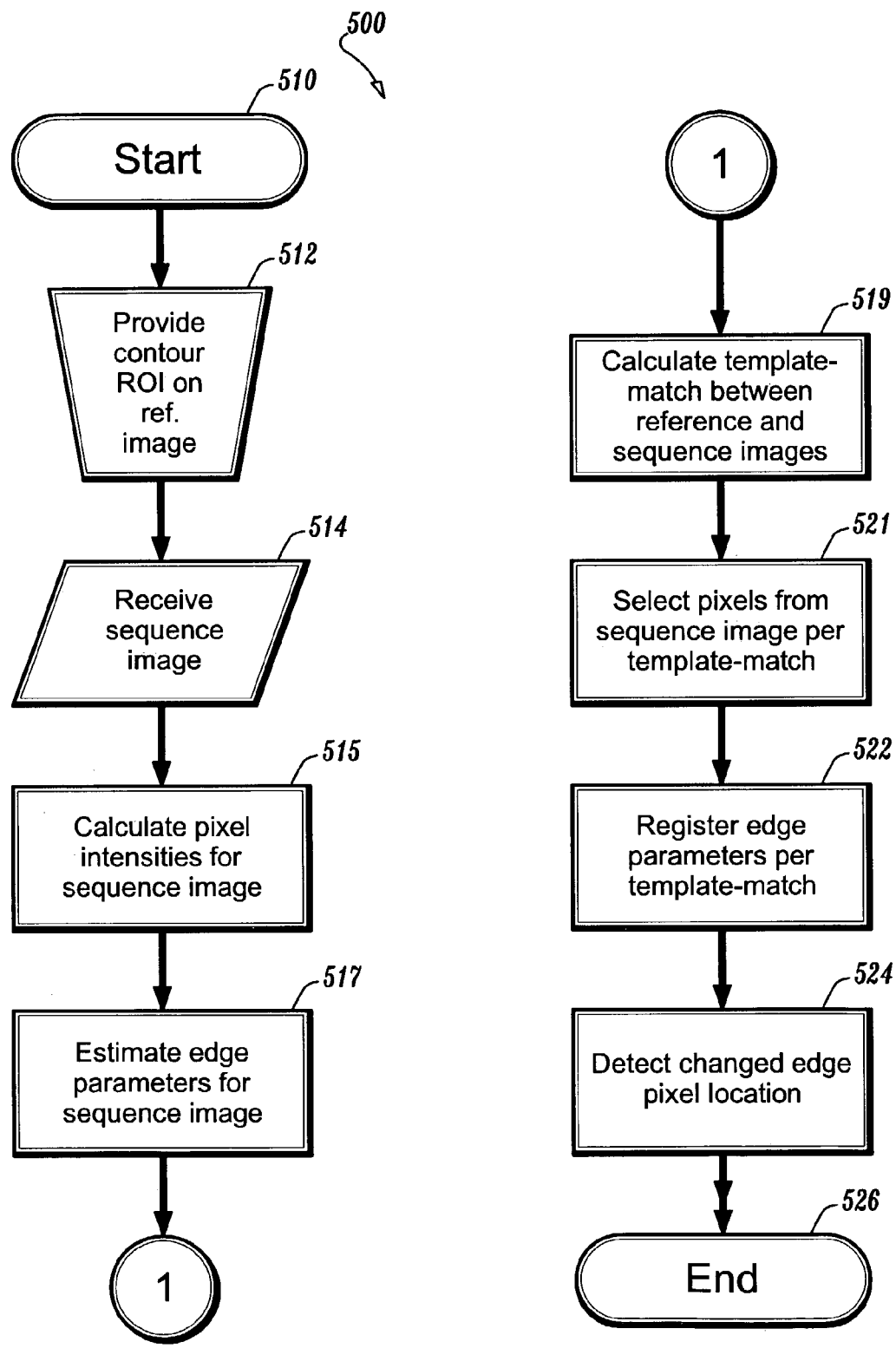
FIG. 5 shows a flowchart for Integrated Image Registration For Cardiac Magnetic Resonance Perfusion Data according to an illustrative embodiment of the present disclosure.

Turning now to FIG. 5, a flowchart for Integrated Image Registration For Cardiac Magnetic Resonance Perfusion Data is indicated generally by the reference numeral 500. A start block 510 passes control to a manual operation block 512, where a physician provides a contour ROI on a reference image from a sequence of images in an exemplary embodiment. The operation block 512 passes control to an input block 514, which receives a sequence image. The input block 514 passes control to a function block 515, which calculates pixel intensities for the sequence image. The function block 515 passes control to a function block 517 that estimates edge parameters for the sequence image. The function block 517 passes control to a function block 519, which calculates the template-match between the reference and the sequence images. The block 519, in turn, passes control to a function block 521, which selects pixels from the sequence image in accordance with the template-match. The block 521 passes control to a function block 522, which registers the edge parameters in accordance with the template-match. The block 522, in turn, passes control to a function block 524, which detects the changed edge pixel locations. The block 524 passes control to an end block, 526.

Thus, in an exemplary embodiment framework, a physician hand draws contours representing the inner endocardial and the outer epicardial boundaries of the myocardium on one image of a sequence of images. These hand drawn contours are automatically propagated to the other images in the sequence of images to automatically segment the MC.

The myocardium segmentation problem is an exemplary image registration problem. Segmentation is achieved by template matching. In this registration framework, a physician hand draws contours denoting the epicardium and endocardium on one of the 2D MR images in the sequence. These contours are used to define a region of interest ("ROI") locally around the hand drawn contours. This ROI, or the template, is then correlated with other images in the sequence to best estimate the myocardium. As the image contrast is changing rapidly, a mutual information ("MI") based match criteria for template matching is utilized while assuming only whole pixel shifts.

There may be sub-pixel shifts in the images that can quickly accumulate to a large motion when only gray-scale information is used. Thus, it is preferred to incorporate edge information within the registration framework to better estimate the registration parameters. Due to rapidly changing contrast in the images, sometimes the epicardium and the endocardium are not visible in a given image. In these cases, gray-scale information is utilized to continue propagating the contours.

An informative example is where, while trying to achieve sub-pixel accuracy in the MI based approach, bilinear interpolation leads to a potentially worse estimate of the registration parameters. Thus, estimation of the registration parameters is limited to only whole pixel shifts, while achieving further accuracy using edge information.

Previous image registration methods that have been proposed remained ad-hoc in their approach, and were generally not suitable for application to integrated image registration for cardiac magnetic resonance perfusion data.

A exemplary method of the present disclosure sets forth a mathematical formulation for the registration framework. The image on which the contours are hand drawn, or where the contours are estimated in the previous iteration, is called the template image. The image where the contours are currently being propagated is called the current image. The registration framework method includes two steps. In the first step it estimates the probability of each pixel in the current image being an edge, as a function of local gradient and location of the contours for the current estimate of the registration parameters. These estimated edge probabilities are then utilized in the second step to estimate the registration parameters.

These two steps are repeated until convergence is reached. Estimating edge probabilities in the current image begins with modeling the current image as a 2D Markov random field ("MRF") with discontinuities. Table A lists several numbered mathematical expressions. Let S be defined by Expression 1 of Table A, which denotes the discrete set of m sites on a 2D grid of the current image. Let N be defined by Expression 2 of Table A, which denotes the neighborhood system with the properties defined by Expressions 3 and 4 of Table A. Let the set of first order cliques $C_1$ and the set of second order cliques $C_2$ be defined by Expressions 5 and 6, respectively. Let F. as defined by Expression 7, be a family of random variables that are defined on S and let f, as defined by Expression 8, be a realization of F. An energy function U(f) is a function of the clique potentials $V_c(f)$, as defined by Expression 9.

Thus, the Gibbs distribution of the random field F is defined for P(f) by Expression 10, which is also the probability density function ("pdf") on the MRF. Z. also called the partition function, is a normalization constant. Let e, as used in Expression 11, be a random variable denoting an edge between sites i and i' and let $E_2$ as defined by Expression 11 denote the set of edges. Let d as defined by Expression 12 denote the observed data. Let s (sigma) denote the standard deviation of the noise in the observed data d. Let $g^2_{ii'}$ denote the local intensity gradient in the current image at the site i. Let $E_1$ as defined by Expression 13 denote the set of corresponding edges, $e^1_i$, on the contours C in the template image. The symbol "><" is used to denote the corresponding edges on the contours C.

In the formulation, corresponding edges are the edges with the shortest Euclidean distance. The distance between the corresponding edges, $e^1_i$ and $e^2_{ii'}$, is denoted by $s^1_i$. Let $L(g^2_{ii'}; s^1_i)$ denote the likelihood of an edge $e^2_{ii'}$ that is a function of local image gradient and distance to the corresponding edge on the contours C. Using these notations, the energy function, for a second order neighborhood, under given information is written as defined by Expressions 14 through 16. The likelihood term $L(g^2_{ii'}; s^1_i)$ is evaluated as defined by Expression 17; where it is assumed that $e^1_i$ and $g^2_{ii'}$ are conditionally independent random variables and P as defined by Expression 18 is evaluated as a function of $s^1_i$. The Gibbs distribution of the random field is then given by P as defined by Expression 19. The energy $E(f; E_2)$ can then be optimized to estimate the maximum a-posteriori ("MAP") estimate of the random field.

However, this is a classical optimization problem that involved both discrete and continuous random variables. To overcome this problem, $E_2$ are usually approximated with continuous variables. However, this exemplary embodiment method of the present disclosure integrates-out the edge variables. In the process of integrating-out the edge variables, a new set of variables, $I_{ii'}$, appear that can be shown to be the probability of not observing an edge given all of the information. That is, for P as defined by Expression 19, after few steps it can be shown that E(f) is as defined by Expression 20. The estimated $I_{ii'}$, as defined by Expression 21, are then utilized on the next step to better estimate the registration parameters.

For estimating registration parameters, let Y. as defined by Expression 22, be a random field denoting pixel intensities of the template image. Let y as defined by Expression 23 be a particular realization. Let T denote the two translation parameters that are being estimated. Then the optimal registration parameters, T', are being estimated as a minimization of the joint conditional entropy T', as defined by Expressions 24 through 26; where $H(E_1; T)$ is assumed to be a constant and H(x) is defined by Expression 27 as the Shannon's entropy. The first term in the equation above is the conditional entropy, which is similar to the gray-scale conditional entropy term in the mutual information formulation. The second term minimizes the entropy of the estimated edges in the current image and the edges on the contours in the template image. Thus, the above formulation integrates the two channels of information to better estimate the registration parameters.

To formulate the problem within the entropy framework, joint entropy between $E_2$ and $E_1$ is approximated as a joint entropy between $E_2$ and the distance transform S(T) of $E_1$. This assumption is based on the intuition that when the two images are registered, the entropy of the distribution of the distances under $E_2$ will be minimal. Thus, H as defined by Expression 28 is evaluated. It is assumed that each pixel is independently distributed, and hence, the joint distribution p is as defined by Expression 29. Thus, the joint entropy $H(E_2; S(T))$ can be written as defined by Expression 30, where $H_{i1}(s)$ is as defined in Expression 31. Further assuming that $H_{i1}(s)$ is identically distributed for each i, and assuming that $H_{i0}(s)$ is almost constant, the joint entropy $H(E_2; S(T))$ is further approximated to be as defined by Expressions 32 and 33. Thus, under the i.i.d. (independent and identical distribution) assumption, the optimal transformation parameters are estimated as T' as defined by Expressions 34 and 35.

In the exemplary implementation, it is further assumed that the edges are localized at the pixels rather than between two pixels. Under this simplifying assumption, the first of two steps includes estimating edge probabilities as defined by Expression 36, where $g^2_i$ denotes the local gradient magnitude at the site i, and Ii denotes the probability of no edge at site i. The second of the two steps includes estimating the registration parameters once the edge probabilities are estimated in the previous step, and then the optimal registration parameters T' are estimated as defined by Expression 37, where <e'> is as defined by Expression 38.

The algorithm is initialized with all edge probabilities set to zero and the temperature 1/B initialized to a high value. The algorithm estimates the registration parameters according to Expression 37, updates the edge probabilities according to Expression 36, decreases the temperature and repeats until convergence.

The results of the integrated registration framework are obtained while estimating only two translation parameters. Thus, it is assumed that there is no rotation. Also, it is assumed that there are no sub-pixel shifts. Where this assumption is not true, it might lead to drifts in estimated registration as the sub-pixel shifts accumulate.

As will be recognized by those of ordinary skill in the pertinent art based on the teachings herein, an expert system or other non-human contour provider is feasible. Thus, embodiments of the present disclosure contemplate the possible substitution of an expert system for initially defining the ROI in an image frame, while utilizing the presently disclosed integrated algorithm based on mutual information and registration of edge information to propagate the contour throughout sequences of image frames.

The presented method is usable with an existing imaging system, and can be applied to many appearance-based image acquisition problems in addition to cardiac perfusion images. Alternate examples may include automatic object detection on assembly lines by machine vision, human face detection in security control, and the like. As shall be recognized by those of ordinary skill in the pertinent art, the term "image" as used herein may also represent three-dimensional, four-dimensional, and higher dimensional datasets in alternate embodiments.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof. Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit. It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

TABLE A

| Expression | Expression Number |
|---|---|
| $S = \{1, \ldots, m\}$ | (1) |
| $N = \{N_i | \forall i \in S\}$ | (2) |
| $i \in N_i$ | (3) |
| $i \in N_{i'} \Leftrightarrow i' \in N_i.$ | (4) |
| $C_1 = \{i | \forall i \in S\}$ | (5) |
| $C_2 = \{\{i, i'\} | \forall i \in S, i' \in N_i\}.$ | (6) |
| $F = \{F_1, \ldots, F_m\}$ | (7) |
| $f = \{f_1, \ldots, f_m\}$ | (8) |
| $U(f) = \sum_{c \in C} V_c(f)$ | (9) |
| $P(f) = \frac{1}{Z}\exp(-\beta U(f))$ | (10) |
| $\varepsilon_2 = \{e^2_{ii'} | \forall i \in S, i' \in N_i\}$ | (11) |
| $d = \{d_i | \forall i \in S\}$ | (12) |
| $\varepsilon_1 = \{e^1_i | e^1_i \triangleright \triangleleft e^2_{ii'} \forall i' \in N_i, e^1_i \in C\}$ | (13) |
| $E(f, \varepsilon_2) = U(f, \varepsilon_2 | d, \varepsilon_1)$ | (14) |
| $= \sum_{i=1}^{m}(f_i - d_i)^2/(\sigma^2) + \sum_{i}\sum_{i' \in N_i}\{L(g^2_{ii'}, s^1_i)(1 - e^2_{ii'}) + \alpha e^2_{ii'}\}$ | (15) |
| $= \sum_{i=1}^{m}(f_i - d_i)^2 + \lambda\sum_{i}\sum_{i' \in N_i}\{L(g^2_{ii'}, s^1_i)(1 - e^2_{ii'}) + \alpha e^2_{ii'}\}.$ | (16) |
| $L(g^2_{ii'}, s^1_i) = P(e^1_i, g^2_{ii'} | e^2_{ii'} = 1) = P(e^1_i | e^2_{ii'} = 1)P(g^2_{ii'} | e^2_{ii'} = 1),$ | (17) |
| $P^{Gb}(E(f, \varepsilon_2)) = \frac{1}{Z}\exp\{-\beta E(f, \varepsilon_2)\}.$ | (18) |
| $P^{Gb}(E(f)) = \sum_{\varepsilon_2} P^{Gb}(E(f, \varepsilon_2)),$ | (19) |

TABLE A-continued

| Expression | Expression Number |
|---|---|
| $E(F) = \sum_{i=1}^{m}(f_i - d_i)^2 + \lambda \sum_i \sum_{i' \in N_i} \{L(g_{ii'}^2, s_i^1) + \ln l_{ii'}\}.$ | (20) |
| $l_{ii'} = \dfrac{1}{1 + \exp\{-\beta\lambda(L(g_{ii'}^2, s_i^1) - \alpha)\}} = P(e_{ii'}^2 = 0 \mid f, \varepsilon_2).$ | (21) |
| $Y = \{Y_1, \ldots, Y_m\}$ | (22) |
| $y = \{y_1, \ldots, y_m\}$ | (23) |
| $\hat{T} = \arg\min_T H(F, \varepsilon_2 \mid Y, \varepsilon_1, T) = \arg\min_T H(F, \varepsilon_2 \mid Y(T), \varepsilon_1(T))$ | (24) |
| $= \arg\min_T [H(F \mid \varepsilon_2\, Y(T), \epsilon_1(T)) + H(\varepsilon_2 \mid Y(T), \epsilon_1(T))$ | (25) |
| $\leq \arg\min_T [H(F \mid Y(T)) + H(\varepsilon_2 \mid \epsilon_1(T)) =$ | (26) |
| $\arg\min_T H(F \mid Y(T)) + H(\varepsilon_2, \epsilon_1(T))],$ | |
| $H(x) = -\Sigma p(x) \log p(x)$ | (27) |
| $H(\varepsilon_2, \epsilon_1(T)) = H(\varepsilon_2 s(T)).$ | (28) |
| $p(\varepsilon_2, S(T)) = \prod_i \prod_{i' \in N_i} p(e_{ii'}^2, s_i) = \prod_i \prod_{i' \in N_i} P(e_{ii'}^2) p(s_i \mid e_{ii'}^2).$ | (29) |
| $H(\varepsilon_2, S(T)) = \sum_i \sum_{i' \in N_i} P(e_{ii'}^2 = 1) H_{i1}(s) + \sum_i \sum_{i' \in N_i} P(e_{ii'}^2 = 0) H_{i0}(s)$ | (30) |
| $H_{i1}(s) = -\sum p(s_i \mid e_{ii'}^2 = 1) \log p(s_i \mid e_{ii'}^2 = 1).$ | (31) |
| $H(\varepsilon_2, S(T)) = \sum_i \sum_{i' \in N_i} P(e_{ii'}^2 = 1) H_{i1}(s) = H_1(s) \sum_i \sum_{i' \in N_i} P(e_{ii'}^2 = 1)$ | (32) |
| $= N\, H_1(s) \dfrac{\sum_i \sum_{i' \in N_i} P(e_{ii'}^2 = 1)}{N} = N <\bar{e}> H_1(s)$ | (33) |
| $\hat{T} = \arg\min_T [H(F \mid Y(T)) + H(\varepsilon_2, \varepsilon_1(T))]$ | (34) |
| $= \arg\min_T [mH(f \setminus \mid y(T)) + N <\bar{e}> H_I(s)]$ | (35) |
| $li = \dfrac{1}{1 + \exp\{-\beta\lambda(L(g_i^2, s_i^1) - \alpha)\}},$ | (36) |
| $\hat{T} = \arg\min_T [H(f \mid y) + <\bar{e}> H_1(s)],$ | (37) |
| $<\bar{e}> = \dfrac{\sum_i P(e_i^2 = 1)}{m}.$ | (38) |

What is claimed is:

1. A method for integrated image registration of cardiac magnetic resonance perfusion data that integrates a first channel of information indicative of pixel intensities with a second channel of information indicative of local gradients, the method comprising:

providing a contoured region of interest on a first image having a plurality of pixels;

receiving a second image corresponding to a time other than that of said first image;

calculating pixel intensities for the second image from the first channel of information;

estimating edge parameters for at least one of said first and second images from the second channel of information;

calculating a template-match between said first and second images;

selecting a pair of pixel locations from at least one of said first and second images in accordance with said template-match;

registering the estimated edge parameters in correspondence with said calculated template-match for a pair of pixel values at said selected locations in said first image and a pair of pixel values at said selected locations in said second image, wherein said registering comprises applying an entropy framework to the first and second images;

compensating for drifts due to sub-pixel shifts by incorporating the second channel of information in association with the applied entropy framework; and detecting a changed pixel location in accordance with said registering and said compensating.

2. A method as defined in claim 1 wherein said second image is temporally consecutive with said first image.

3. A method as defined in claim 1, further comprising maintaining said first image as a reference for calculating a plurality of template-matches corresponding to a plurality of second images.

4. A method as defined in claim 1 wherein said detecting a changed pixel location is not compromised by a change in contrast.

5. A method as defined in claim 1 wherein the second channel of information is incorporated periodically at a rate less than a frame rate.

6. A system for integrated image registration of cardiac magnetic resonance perfusion data that integrates a first channel of information indicative of pixel intensities with a second channel of information indicative of local gradients, the system comprising:

an estimation unit for estimating contour region means for providing a contoured region of interest on a first image having a plurality of pixels;

second image means for receiving a second image corresponding to a time other than that of said first image;

pixel intensity means for calculating pixel intensities for the second image from the first channel of information;

an edge parameter for at least one of said from the second first and second images channel of information;

a registration unit in signal communication with the estimation unit for registering the edge parameter in correspondence with a template-match from the first channel of information between pixels in a first input image and pixels in a second input image and compensating for drifts due to sub-pixel shifts by incorporating the second channel of information in association with an entropy framework; and a CPU in signal communication with said estimation unit and said registration unit for detecting a changed pixel location in accordance with said registration unit when the entropy of said second image is increased.

7. A system as defined in claim 6 wherein at least one of said first and second input images comprises cardiac magnetic resonance image.

8. A system as defined in claim 6, further comprising:

a display adapter in signal communication with the CPU for displaying at least one of said edge parameter and said first and second input images; and an I/O adapter in signal communication with the CPU for recalling the locations of the pixels from the displayed image to provide an indication of the location of a changed pixel location within an input image.

9. A system as defined in claim 6, further comprising:

a user interface adapter in signal communication with the CPU for at least receiving a region of interest contour selection for one of a sequence of images from a user.

10. A system as defined in claim 6, further comprising:

a magnetic resonance imaging device in signal communication with said CPU for at least providing a sequence of magnetic resonance perfusion images of a patient.

11. A system as defined in claim 6 wherein the second channel of information is incorporated periodically at a rate less than a frame rate.

12. A system for integrated image registration of cardiac magnetic resonance perfusion data that integrates a first channel of information indicative of pixel intensities with a second channel of information indicative of local gradients, the system comprising:

providing means for providing a contoured region of interest on a first image having a plurality of pixels;

receiving means for receiving a second image corresponding to a time other than that of said first image;

calculating means for calculating a template-match between said first and second images from the first channel of information;

selecting means for selecting a pair of pixel locations from at least one of said first and second images in accordance with said template-match;

estimating means for estimating edge parameters for at least one of said first and second images from the second channel of information;

registering means for registering the estimated edge parameters in correspondence with said calculated template-match for a pair of pixel values at said selected locations in said first image and a pair of pixel values at said selected, wherein said registering means comprises applying means for applying an entropy framework to the first and second images;

compensating means for compensating drifts due to sub-pixel shifts by incorporating the second channel of information in association with the applied entropy framework; and detecting means for detecting a changed pixel location in accordance with said registering and said compensating.

13. A system as defined in claim 12 wherein said second image is temporally consecutive with said first image.

14. A system as defined in claim 12, further comprising maintaining means for maintaining said first image as a reference for calculating a plurality of template-matches corresponding to a plurality of second images.

15. A system as defined in claim 12 wherein said detecting means for detecting a changed pixel location is not compromised by a change in contrast.

16. A system as defined in claim 12 wherein the second channel of information is incorporated periodically at a rate less than a frame rate.

17. A program storage device readable by machine, tangibly embodying computer readable medium a program of instructions executable by the machine to perform method steps for integrated image registration of cardiac magnetic resonance perfusion data that integrates a first channel of information indicative of pixel intensities with a second channel of information indicative of local gradients, the method steps comprising:

providing a contoured region of interest on a first image having a plurality of pixels;

receiving a second image corresponding to a time other than that of said first image;

calculating a template-match between said first and second images from the first channel of information;

selecting a pair of pixel locations from at least one of said first and second images in accordance with said template-match;

estimating edge parameters for at least one of said first and second images from the second channel of information;

registering the estimated edge parameters in correspondence with said calculated template-match for a pair of pixel values at said selected locations in said first image and a pair of pixel values at said selected, wherein said registering comprises applying an entropy framework to the first and second images;

compensating for drifts due to sub-pixel shifts by incorporating the second channel of information in association with the applied entropy framework; and detecting a changed pixel location in accordance with said registering and said compensating.

18. A program storage device as defined in claim 17 wherein said second image is temporally consecutive with said first image.

19. A program storage device as defined in claim 17, the method steps further comprising maintaining said first image as a reference for calculating a plurality of template-matches corresponding to a plurality of second images.

20. A program storage device as defined in claim 17 wherein said detecting a changed pixel location is not compromised by a change in contrast.

21. A program storage device as defined in claim 17 wherein the second channel of information is incorporated periodically at a rate less than a frame rate.

* * * * *